United States Patent [19]

Juvinall

[11] 4,230,266

[45] Oct. 28, 1980

[54] METHOD AND APPARATUS OF CAVITY IDENTIFICATION OF MOLD OF ORIGIN OF A GLASS CONTAINER

[75] Inventor: John W. Juvinall, Ottawa Lake, Mich.

[73] Assignee: Owens-Illinois, Inc., Toledo, Ohio

[21] Appl. No.: 33,080

[22] Filed: Apr. 25, 1979

Related U.S. Application Data

[62] Division of Ser. No. 864,080, Dec. 23, 1977.

[51] Int. Cl.[3] .......................... G06K 19/06; G01V 9/04

[52] U.S. Cl. .................................... 235/490; 235/462; 250/223 B

[58] Field of Search ............... 235/487, 490, 494, 462; 250/223 B, 568; 209/583; 356/240

[56] References Cited

U.S. PATENT DOCUMENTS

| | | | |
|---|---|---|---|
| 3,745,314 | 7/1973 | Mathias et al. | 250/223 B |
| 3,757,090 | 9/1973 | Haefeli et al. | 235/494 |
| 3,923,158 | 12/1975 | Fornàá | 235/464 |
| 3,963,918 | 6/1976 | Jensen et al. | 250/223 B |
| 3,971,917 | 7/1976 | Maddox et al. | 235/494 |
| 3,991,883 | 11/1976 | Hobler et al. | 235/464 |
| 4,004,904 | 1/1977 | Fergusson | 65/158 |

*Primary Examiner*—Daryl W. Cook

*Attorney, Agent, or Firm*—D. T. Innis; M. E. Click; D. H. Wilson

[57] ABSTRACT

A system is disclosed for determining which of a plurality of molds produced a particular container. A specific concentric ring code is molded into the bottom of each container as it is produced. This code is defined by absence or presence of rings at possible ring positions. No rings are formed in adjacent positions. The containers are then passed by a reading station, where light whose intensity is proportional to the angle of incidence is projected onto the bottom of the container. The variation of intensity of light reflected to a particular point is used to determine the position of the rings on the container and suitable electronics may then decode the ring position to determine the container code, thus permitting identification of the mold which produced each container.

5 Claims, 16 Drawing Figures

FIG. 4F
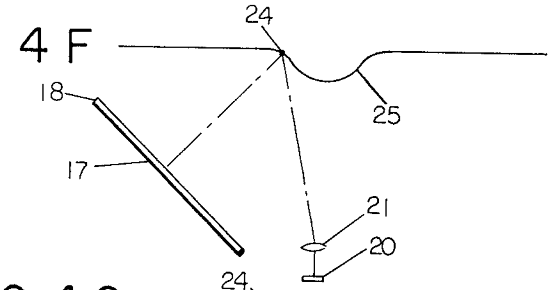
FIG. 4G
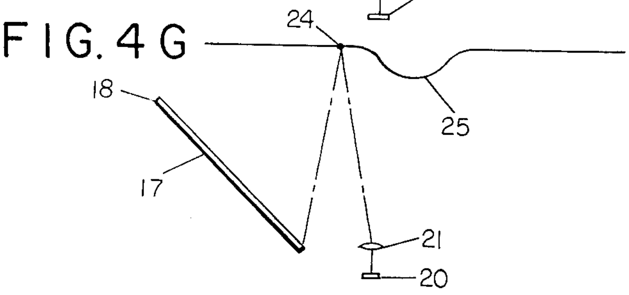
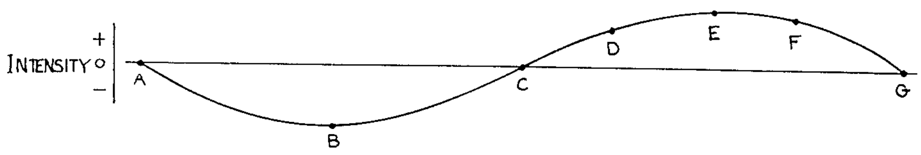
FIG. 5

METHOD AND APPARATUS OF CAVITY IDENTIFICATION OF MOLD OF ORIGIN OF A GLASS CONTAINER

This is a division of application Ser. No. 864,080 filed Dec. 23, 1977.

BACKGROUND OF THE INVENTION

Defects in glass bottles are often mold related. For this reason, it is useful to have a system which can identify which of a plurality of molds produced a particular bottle. The defective mold may then be shut down while the remaining molds continue to operate. Alternatively, the defective bottles may be automatically selected out as they proceed down the production line.

Mold identification is generally accomplished by molding a particular code into each bottle during the forming process. The code is later read by a scanner, which identifies the defective mold. Another method is to mark bottles produced by a particular mold, which allows for later identification and separation, as shown in U.S. Pat. No. 4,004,904. This system has the disadvantage of requiring that the bottles be in a particular sequence in order to allow proper marking of mold origin.

Several techniques have been developed for encoding a bottle and for reading the code. In U.S. Pat. No. 3,745,314, a bottle is held stationary while an image of a code molded into the bottom of a bottle is rotated past a reading station. The major disadvantage of this design is that the bottle must be at a standstill while the code reading is taking place, thus slowing down the production line process. In U.S. Pat. No. 3,963,918, a bottle with a circular code is brought to a standstill, and the code is read either by rotating the bottle or the reading receiver. This has the similar disadvantage of having to stop the bottle. U.S. Pat. No. 3,991,883 does not require bringing the bottle to a standstill, but still requires relative rotation between the bottle and the light source which is utilized to project the coded information onto the reading apparatus. A further disadvantage of all of the above-named inventions is that they employ a circular code, whose validity may be checked only by making successive readings of the code.

A principal advantage of the present invention is that no relative rotation between the bottle and the reading device or light source is required, thus simplifying operation.

Another advantage of the present invention is that readings may be taken simultaneously in several areas of the bottle in order to check the validity of the code reading, thus increasing the accuracy of mold identification.

SUMMARY OF THE INVENTION

This invention relates to a system for automatically identifying which of a plurality of molds produced a particular glass bottle. In the preferred embodiment, a series of concentric rings is molded into the bottom of each bottle during production. The location of these rings on bottles produced by a particular mold differs from the location of rings on bottles produced by every other mold, thus providing a code to distinguish mold origin of particular bottles.

After production, the bottles are passed above a reading station where the coded series of rings is read. This is accomplished by focusing a light source through a lens towards the bottom of the bottle. The light passes through a filter which causes the intensity of the light to vary linearly with its angle of incidence upon the bottom of the bottle. The light is reflected from the bottle through a second lens and directed to a photocell light sensor, whose output is proportional to the intensity of light received. As the bottle is moved past the scanning station, the angle of incidence, and thus the intensity, of light reflected off of the bottle and through the lens will vary depending upon whether the reflection is from the relatively flat bottom surface of the bottle or a leading or falling edge of a ring. By detecting the rate of change of intensity between leading and falling edges of the rings on a bottle, accurate detection of ring placement is accomplished in spite of defects in the bottom of the bottle such as faint rings or near zero push-ups (bulges in the center of the bottoms of bottles). The position of rings defines a code which is then electronically decoded so as to identify the mold of origin of each container.

BRIEF DESCRIPTION OF THE DRAWINGS

In the drawings:

FIG. 5 is a graph of the intensity of light received by the photocell detector as the glass container moves past the code reading device;

DETAILED DESCRIPTION OF THE DRAWINGS

Figure 1:
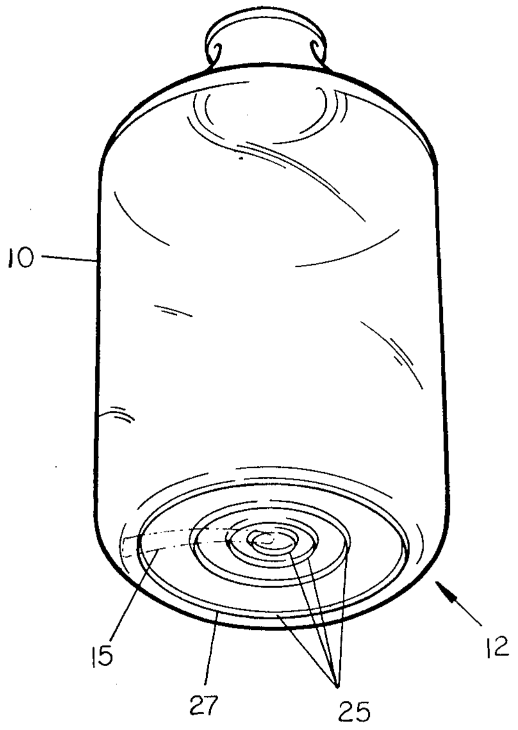
FIG. 1 shows a glass container with an integrally molded concentric ring code.
Figure 2:
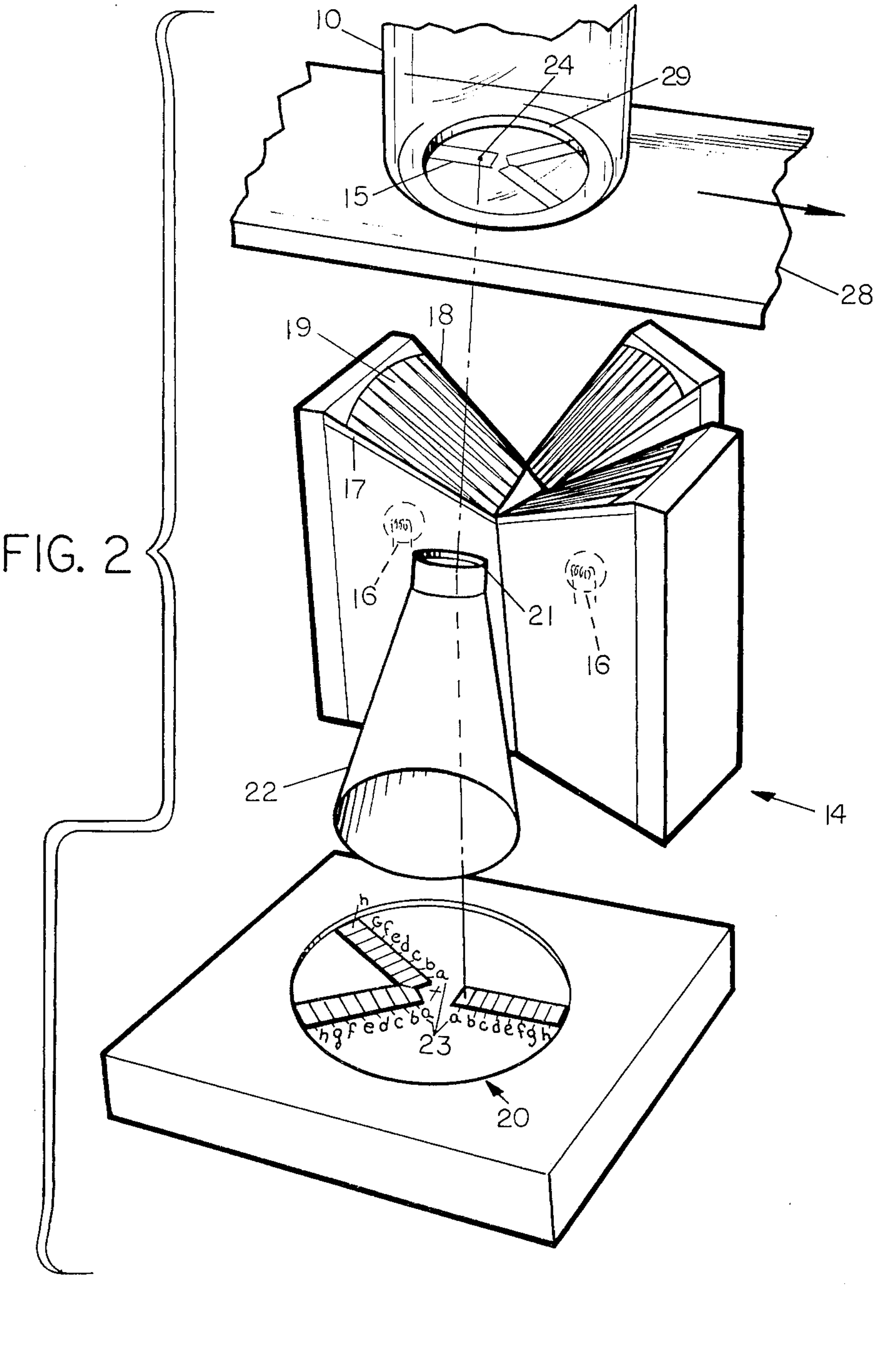
FIG. 2 shows a view of a code reading device with a glass container passing above it.
Figure 4A:
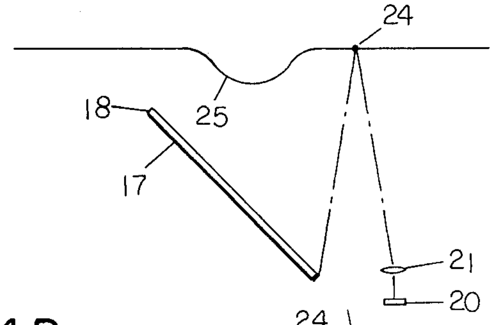
FIGS. 4 A–G show the path of light reflected to a photocell detector as the glass container moves past the code reading device.
Figure 4B:
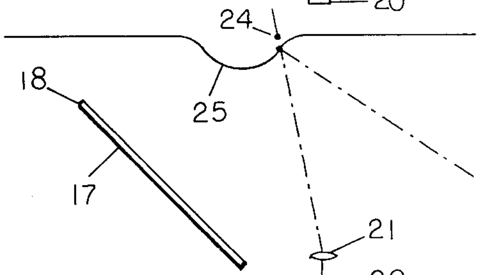
Figure 4C:
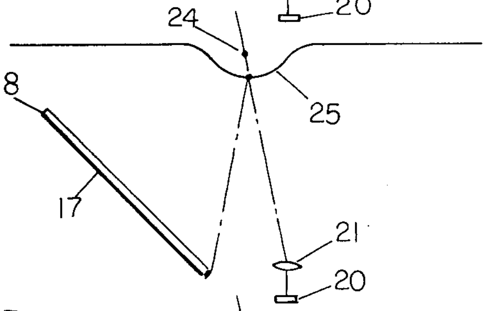
Figure 4D:
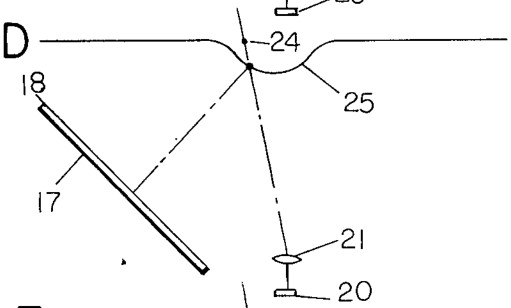
Figure 4E:
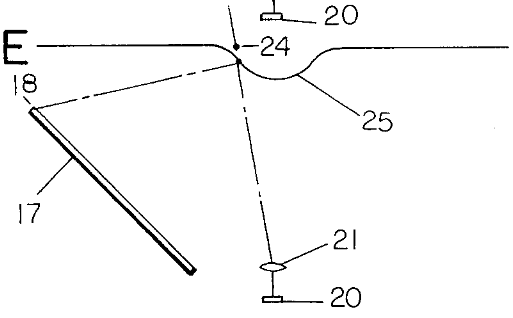

Referring to FIG. 1, a molded container 10, which in the preferred embodiment is a glass bottle, includes an integrally molded concentric ring code 12, having a plurality of rings 25, including an outside start ring 27, which are defined by projections which are generally rounded. As shown in FIG. 2, the container 10 is supported above a reading station 14 and moved relative to it by a transport apparatus 28, which includes an opening 29 to allow readings to be taken from the bottom of a container 10. As the container 10 is moved past the reading station 14, light reflected from the start ring 27, included in the ring code 12, initiates the code reading process. The function of the start ring 27 will be explained when the decoding process is discussed. Light from a light source 16, which in the preferred embodiment is incandescent, passes through a lens 17, a gradient filter 18, and is projected onto the bottom of the container 10. The lens 17 focuses light from the light source 16 through the filter 18 and onto an area 15 across a radius of the bottom of container 10. The gradient filter 18, which is generally rectangular in shape, is constructed such that its transparency is gradually reduced along the length of its traversing axis. In the present embodiment, this is accomplished with a series of narrowing slits 19, but other methods could also be employed. The slits 19 are sized, as shown in FIG. 2 so that light emanating from the filter 18 is attenuated linearly along its traverse axis. The filter 18 is positioned such that the intensity of light striking any particular point in area 15 on the bottom of the container 10 is a function of the angle of incidence. Because of the tapered slits 19 that form the filter 18, as shown in FIG. 2, the light passing out of the filter 18 will be of greater intensity at the left or upper end of the filter than the right or lower end of the filter. Thus light, that originates at the upper end of the filter and reflected from the container onto the detector 20, will be of greater intensity than light that passes through the lower end and is reflected from the bottom of the container. The intensity of the light striking the bottom of the container will be a function of the angle of incidence relative to the plane of the container bottom because of the filter. A lens 21, supported by a housing 22, focuses light reflected from the bottom of container 10 onto a photocell detector means 20, whose output is proportional to the intensity of light received. The photocell means 20 receives reflections from a location on the container 10 corresponding to particular fixed reference point 24 on a plane generally defined by the bottom of the container 10. In the preferred embodiment of the invention, a plurality of photocell detectors 23 *a–h* comprise the photocell detector means 20, with each detector 23 *a–h* having a corresponding reference point from which it receives reflections. As can be seen when viewing FIG. 2, the entire image of the bottle bottom illumination will be projected onto the pickup 20. Obviously the reflected light will be that which is the result of specular reflection from the container bottom. For the purposes of clarity, the operation of only one of the photocell detectors 23 *a–h* is discussed here. As the container 10 passes the reference point 24, light received by the photocell detector 23-*a* will vary in intensity depending upon the angle of incidence of light emanating from the filter 18 since this is the light that is reflected from the container onto the detector. The origin and therefore the intensity of the light that is reflected from a ring 25 will depend upon whether the light passes from the upper or lower end of the filter 18 as viewed in FIG. 4. Since the angle of incidence varies when a ring 25 is encountered, the intensity of light striking the photocell detector 23-*a* will likewise vary whenever a ring 25 passes the reference point 24. The output of the photocell detector 23-*a* is thus a function of the placement of rings 25 on the bottom of container 10.

To allow the validity of a particular reading of the ring code 12 to be checked, three separate reflective readings are taken from the bottom of the container 10, and later compared by the use of majority logic, to be discussed in conjunction with FIG. 11. In the preferred embodiment of the invention, three light sources 16, three lenses 17, three filters 18 and three groups of photocell detectors 23 *a–h* are positioned to take reflective readings from three distinct radial areas 15 across the ring code 12.

Figure 3:
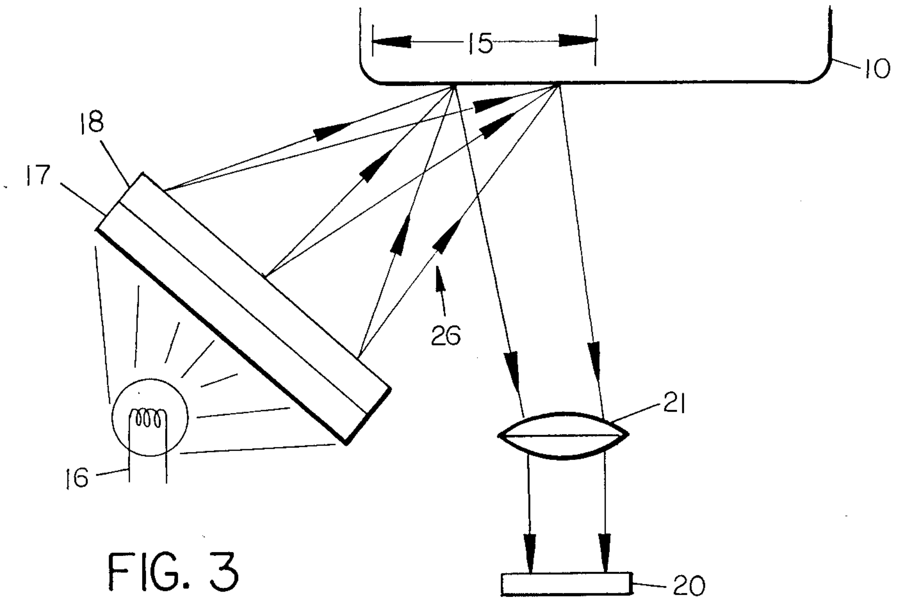
FIG. 3 shows paths of light travel from a light source to the bottom of a glass container.

Referring now to FIG. 3, the light path from the filter 18 to the radial area 15 on container 10 is shown. Light rays 26 demonstrate that at any point along the radial area 15, light is received from all points along the length of the filter 18. The origin of light which is reflected to the photocell detector means 20 from any point will depend upon the angle of incidence on the bottom of the container 10.

Referring to FIGS. 4 A–G and 5, the change in intensity of light reflected to the photocell detector 23-*a* from the reference point 24 as the container 10 moves past the reading station 14, is shown. In FIG. 4A, a flat portion of the bottom of the container 10 is in a position corresponding to the reference point 24 (i.e. no ring). Light reflected from this point is seen to have originated from a relatively dim portion of the filter 18. The intensity of light reflected from this point is taken as a reference or zero level. As the container moves past the reference point 24, a ring 25 is encountered. As the reference point 24 is passed by the leading edge of the ring 25, no light is reflected to the lens 21. The only light reflected to the lens 21 at this point would be ambient light, as shown in FIG. 4B. When the reference point 24 corresponds to the top of the ring 25 (FIG. 4C), the angle of reflection is the same as that from the flat area where no ring is present. When the falling edge of the ring 25 moves past the reference point 24, however, light is progressively reflected from brighter portions of the filter 18, as shown in FIGS. 4D and 4E. The reflective angle, and thus the intensity of light, then gradually decreases (FIG. 4F) until the reference point 24 again corresponds to a portion of the container 10 where no ring 25 is present (FIG. 4G). A graph of the intensity of light reflected as the container 10 moves past the reading station is shown in FIG. 5, with points A–G corresponding to the position of the container in FIGS. 4 A–G, respectively.

Figure 6A:
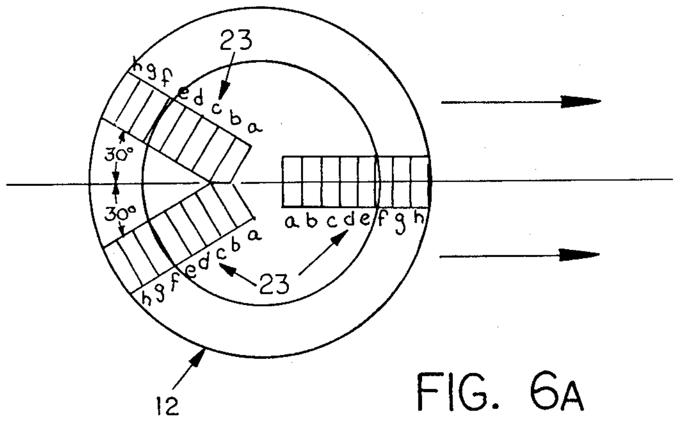
FIGS. 6 A–C show different possible locations of photocell detectors in relation to the molded concentric ring code.
Figure 6C:
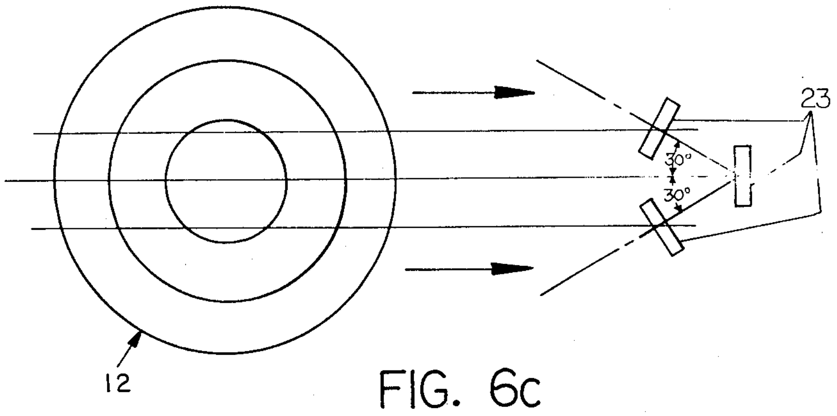
Figure 6B:
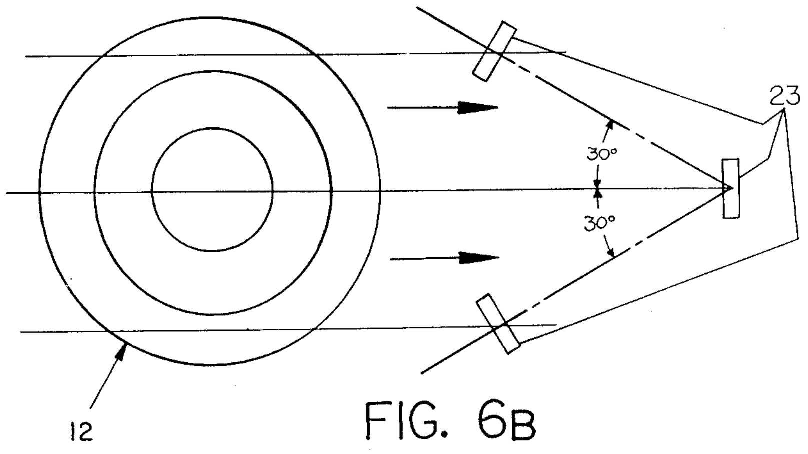

Referring now to FIGS. 6 A–C, the photocell means 23 used for readings in each of the three radial areas 15 includes eight photocell detectors 23 *a–h* arranged along a line corresponding to a radius of the ring code 12 when it is centered over the reading station 14. In the preferred embodiment of the invention, one group of photocell detectors 23 *a–h* is positioned corresponding to the line of motion of the center of the ring code 12, while the other two groups of photocell detectors 23 *a–h* are positioned at 30° angles with respect to the line of motion of the center of the ring code 12. The size of this angle is not critical but should be large enough to take readings in relatively distinct areas of the ring code 12. A plurality of photocell detectors 23 are employed, each one responding to reflections from only a small portion of a radius of the ring code 12 (i.e. each has its own reference point 24) on the bottom of the container 10, to allow readings to be taken from radii off of the line of travel of the center of the ring code 12. Use of only one detector would require placement relatively close to the line of travel of the center of the ring code 12, as placement well off of the line would result in the inability to read the inner rings of the code 12 as the container 10 passed by the reading station 14, as shown by FIG. 6B. Close placement, however, would result in readings being taken in areas of the ring code 12 which are relatively close to one another, as shown by FIG. 6C. By utilizing a plurality of photocell detectors 23, every ring 25 may be read while allowing relatively distinct areas of the ring code 12 to be read. Each photocell 23 *a–h* responds to reflections over a small portion of the radius of ring code 12. These readings are later combined to obtain a reading of the entire ring code 12, as will be discussed in connection with FIG. 10.

Figure 7:
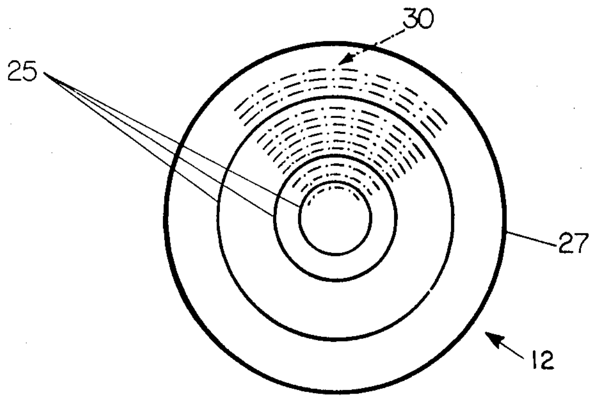
FIG. 7 shows a plan view of a concentric ring code.

Referring to FIG. 7, the start ring 27 is the outermost ring of the ring code 12, and is molded at the same position in the bottom of every container 10. The ring code 12 is defined by the presence or absence of a ring 25 within each of a particular number of possible generally designated ring positions 30. The presence of a ring 25 in a possible position 30 defines the binary bit 1, while the absence of a ring 25 in a possible position 30 defines the binary bit 0. Various combinations of rings 25 thus define different binary code numbers, which may be used to identify the mold of origin of any container 10. It should be appreciated that it is not necessary that a binary code be utilized and that many different code configurations (e.g. octal) could be employed.

Figure 8:
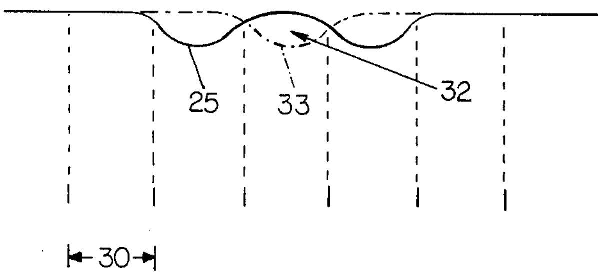
FIG. 8 shows a side view of rings which are molded into particular positions in a glass container.

The number of rings 26 which may be molded into a container is relatively low, which correspondingly limits the number of possible coded ring combinations. In order to maximize the number of combinations, the number of possible ring positions 30 is increased, but the code is defined such that there will never be rings 25 in two adjacent possible positions 30. Referring to FIG. 8, a valley 32 between rings 25 in alternate possible ring positions 30 would encompass enough of a relatively flat area to define a binary zero corresponding to the absence of a ring 25 in that particular possible ring position 30. The physical limitation that no rings 25 can occupy two adjacent possible ring positions 30 is illustrated by dotted line 33, which represents the position a ring 25 would occupy in an adjacent possible ring position 30. In such a case, the rings 25 would not be able to be fully formed, and it would not be possible to obtain a valid code reading.

To illustrate the use of the code just described, a container 10 large enough to allow six rings 25 to be molded into it would have $2^6$ or sixty-four possible combinations, if six possible ring positions 30 are used. By utilizing eleven possible ring positions 30 with no two rings 25 in adjacent possible positions 30, however, the number of combinations increases to two-hundred-thirty-two. As this many combinations is generally not needed, the code which is molded into a container 10 may be restricted to particular combinations of rings 25 and each reading checked against this restriction in order to increase the accuracy of the code readings. In the preferred embodiment of the invention, utilizing a container 10 with eleven possible ring positions 30, a dual restriction is employed. The first of these is that there will always be exactly three rings 25 present in the code in addition to the start ring 27. Secondly, either one or two of these rings 25 will be located within the three innermost possible ring positions 30, with the prohibition against rings 25 in adjacent possible ring positions 30 still applying. The number of possible combinations with these limitations is reduced to sixty-four, which is generally as many as would be needed. The restrictions serve to prevent the registering of incorrect readings of a code caused, for example, by molding defects or variations from flatness in the bottom of the container 10. As an example, a molding defect might be read as an additional ring 25, but the reading would be rejected as invalid since four rings 25 would now be read instead of three.

A computer is programmed to analyze the information stored in the memory to determine the mold of origin of a container 10. Initially, readings from the three outside photocells 23*h* are analyzed in order to determine the position of the start ring 27. Sensing of the start ring 27 is accomplished by looking at the amplitude of the readings taken from the outside photocells 23-*h* over a period of time and determining the slope of the amplitude. If the slope exceeds a predetermined level, a start ring 27 is assumed to be present. The position of the start ring 27 marks the point in time where readings from the remainder of the photocells 23 *a–h* are taken. For example, if a start ring 27 was at a location corresponding to the tenth reading stored in the memory, readings from the remainder of the photocells 23 *a–h* would be analyzed in an area centered about the tenth reading. In this way, readings from the photocells 23 are analyzed only if they correspond to proper positioning of the container 10. This function is carried out separately for each of the three groups of eight photocells 23 *a–h*.

After the position of the start ring 27 has been determined, the computer decodes the information stored in the memory. The position of rings 25 is determined in the same manner as the start ring 27, i.e. if the slope of the amplitude in a possible ring position 30 exceeds a predetermined level, a ring 25 is assumed to be present in that location. Once the position of rings 25 has been determined, the binary code represented by the placement of rings 25 may be decoded to decimal form. In the decoding process, the direction of travel of the container 10 past the reading station 14 may be compensated for by instructing the computer the order in which to analyze the readings from each of the photocells 23 *a–h*, and whether to look for a positive or negative slope.

After decoding, a validity check 68 is made of each of the three code readings, as described in connection with FIG. 7. If the validity check is not met, i.e. there were not three total rings 25 and either one or two rings 25 in the three innermost ring positions 30, that particular reading is rejected as invalid. The remaining valid readings are then compared by a majority logic 70, and a code readout 72, identifying the mold of origin of the container 10, is given which corresponds to a majority of the valid readings.

Although there is herein described only one specific embodiment of the present invention, it is to be understood that the invention is not intended to be limited to such embodiment but only by the scope of the appended claims.

What is claimed is:

1. A glass container with an integrally molded concentric ring code, said code being defined by the presence or absence of rings within possible ring positions, and with the limitation that no two rings occupy adjacent possible ring positions.

2. The container of claim 1 further including the limitation that one ring will be present in the same position for all containers to serve as the "start" ring.

3. The container of claim 2 further including the limitation that exactly three rings in addition to the "start" ring will be present in the container bottom.

4. A glass container having integrally molded, concentric rings formed in the base thereof to provide an indication of the mold of origin, said rings being concentric with respect to the longitudinal axis of the container and being of a size which are sufficient to be detected by specular reflection of a beam of light therefrom.

5. The container of claim 4 further including the characteristic that adjacent, possible, ring positions will not be occupied by rings.

* * * * *